May 25, 1971     W. BALLE ET AL     3,579,736
TIRE VULCANISING PRESS

Filed May 15, 1969     4 Sheets-Sheet 1

Inventors
Walter Balle
Günter Pommer
By Watson, Cole, Grindle + Watson
Attys.

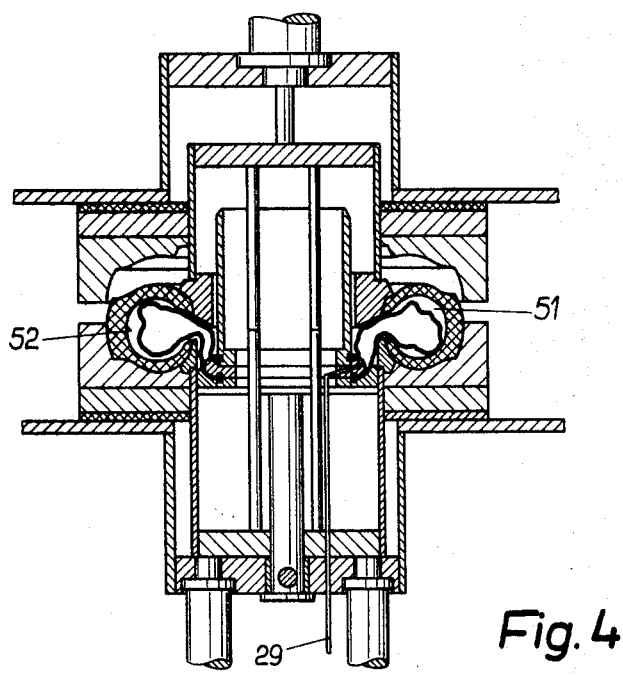
Fig. 4
Fig. 5
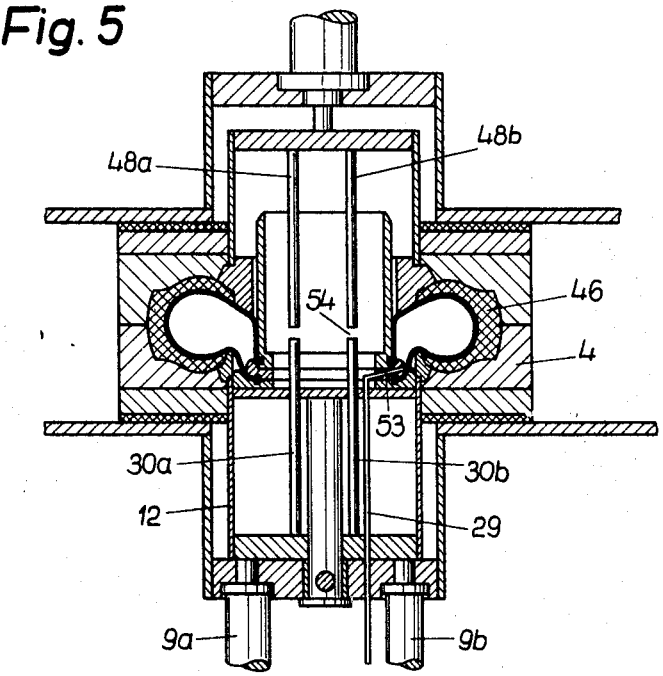
Inventors
Walter Balle
Günter Pommer
By Watson, Cole, Grindle & Watson
Attys.

3,579,736
TIRE VULCANISING PRESS
Walter Balle, Dornigheim, and Gunter Pommer, Frankfurt am Main, Germany, assignors to Leonhard Herbert Maschinenfabrik, Bergen-Enkheim, Germany
Filed May 15, 1969, Ser. No. 824,879
Claims priority, application Germany, May 17, 1968,
P 17 78 616.2
Int. Cl. B29h 5/02
U.S. Cl. 18—17                                  7 Claims

ABSTRACT OF THE DISCLOSURE

A tire vulcanising press includes a heating bag, an upper part having an upper mould half and a lower part having a lower mould half, an assembly on the lower part including an outer or ejection cylinder, an inner bag guiding cylinder within the outer cylinder, it being arranged that the bag when folded fits into the annular space between the cylinders and that the two cylinders are axiallly displaceable, a driving system for driving the outer cylinder axially whereby the inner cylinder is moved axially by the frictional force between the outer cylinder, the bag and the inner cylinder so that the bag is introduced into a tire, and a locking device for locking the inner cylinder in its raised position.

BACKGROUND OF THE INVENTION

The invention relates to a tire vulcanising press for vulcanising preformed tire "blanks," and it has particular, though not exclusive, application to the retreading of tires intended for commercial vehicles, and includes a heating bag which is retractable into an annular space between two relatively displaceable cylinders arranged one within the other whilst being folded double, the outer of these two cylinders carrying a tire rim seating ring and the inner cylinder acting as a guide for the bag.

During the vulcanisation of heavy tires, such as tires for commercial vehicles or tractors, the insertion and extraction of a blank tire or of a blank tire or of a remoulded tire equipped with a crude unformed tread, should easily be possible, since such tires have a considerable weight. A low loading height should accordingly be provided. Feed mechanisms are commonly available on tire vulcanising presses for larger tires. For these too, it is desirable that the tires should be insertible at as low a height as possible above the lower half of the mould. A small opening stroke is also desirable in tire vulcanising presses, on the one hand to keep the overall height of the press as low as possible, and on the other hand so that the driving mechanism for the lifting and lowering of the upper part of the press may be made as small and inexpensive as possible.

The present invention is based on the problem of providing a press of the kind initially referred to with a minimum structural height and a minimum required opening stroke, in such a manner that the loading height is as low as possible. A separate drive for the insertion of the bag is also to be avoided.

SUMMARY

According to the present invention, there is provided a tire vulcanising press for vulcanising preformed tire blanks including an upper part and a lower part, a mould having an upper half on the upper part of the press and a lower half on the lower part of the press, and an assembly on the lower part of the press having an outer cylinder, a lower seat ring for a tire rim on the outer cylinder, a driving system for the outer cylinder, the outer cylinder being movable axially by the driving system to eject a tire from the lower half of the mould, an inner cylinder within the outer cylinder movable into an upper position, a heating bag which may be arranged, when folded double, in the annular space between the inner and outer cylinders and which may be guided by the inner cylinder, clamping rings connected to the inner cylinder between which the edges of the bag may be clamped, and a locking device for retaining the inner cylinder in the upper position, the inner cylinder being drawn into the upper position during an upward axial movement of the outer cylinder by the frictional forces between the bag, the inner cylinder and the outer cylinder.

In one embodiment of a press for heavy tires, the ejector or outer cylinder required to remove the tire from the lower half of the mould, is simultaneously used as a drive for moving the bag into the operating position. The heating bag is held fast in the operating position by a locking device, even when the ejector cylinder is retracted, so that the tire blank to be vulcanised may be laid into the lower half of the mould. A separate drive for the bag is thus unnecessary, and there is no increase in structural height. The opening stroke need merely be sufficient for the tire to be inserted conveniently between the halves of the mould, at the same time enabling a loading system with a small height to be used. The arrangement of the bag in the lower part of the press makes it possible for a bore for the inflow and outflow of heating water to be at the lowest point of the bag. This has the advantage that any steam formed above the water level during the draining of the bag, forces the water out of the bag, resulting in very short draining periods.

The inner or bag guiding cylinder may be connected to a downwardly projecting rod which is locked by an arrangement in the lower part of the press, for example by means of a locking bolt entering a transverse bore or hole in the rod. This locking bolt may be operated hydraulically, pneumatically or electromagnetically, and it may snap into position when the ejector cylinder has drawn the bag guiding cylinder and the bag by friction to a distance such that the transverse bore or hole of the downwardly projecting rod is situated at the level of the locking bolt. During the subsequent downward movement of the ejector cylinder, the bag guiding cylinder cannot be drawn downwards and the bag penetrates into the cavity of the tire.

In a preferred embodiment of the invention, the bag clamping rings are combined into an assembly firmly joined to the lower extremity of the bag guiding cylinder, its individual rings being in pressure-tight contact with each other. This arrangement of the bag clamping device has the result that the pressure of the heating water or stream filling the bag during heating with the press closed completely, cannot act on a complete circular surface but merely on an annular area which is internally delimited by the clamping lines of the edges of the bag. The forces acting on the halves of the mould, tending to spread the halves of the mould apart, are reduced thereby by approximately 12 to 15% compared to presses in which the pressure can act close to the axis of the bag.

The press is preferably equipped with a loading device including a tire support, the tire support being situated in a known manner at such a height that, in its fully raised position, the ejector cylinder lifts the tire off the tire support. The task can be performed by the tire ejection cylinder without detriment to its complementary task of bringing the heating bag into the operating position.

So that the loading device may be inserted as close as possible above the lower half of the mould, the upper edges of the bag guiding cylinder and the folding line of the bag are situated, when the bag guiding cylinder and the bag are inserted most deeply into the ejector cylinder, preferably at the same height or lower than the rim seating ring situated on the upper edge of the ejector cylinder. In the case of such dimensions, no part of the lowered ejector cylinder projects above the upper edge of the lower part of the press, so that the loading device can be inserted closely above the lower part of the press.

In a further embodiment of the invention, the base of the ejector cylinder is connected to at least one upwardly projecting thrust rod, having an end face which co-operates with the end face of another thrust rod which is fastened to the cover of an axially displaceable cylinder carrying the upper rim seat ring on its lower edge. This other rod projects downwards, and the lengths of the two thrust rods are so matched that the upper and lower rim seat rings are held at a distance which is preferably a little smaller than the final spacing between the rim seat rings when the press is closed completely. In this way, it may be ensured in simple manner that the tire rims cannot come unacceptably close to each other, so that a gap of sufficient width for the insertion of the heating bag into the tire cavity is retained. The rim seats can nevertheless be brought to close to each other that the upper rim seat still grasps the upper tire rim when the rims of the blank have been brought close to each other by being stored in a pile. This is of importance because the upper rim seat ring guides the bag into the tire cavity.

The driving device which may be referred to as the upper driving device and which causes the upper rim seat ring to be displaced, is preferably a pressure fluid cylinder, which is more powerful than the device which may be referred to as the lower driving device actuating the ejector cylinder, so that the upper driving device can displace the ejector cylinder through the thrust rods against the force of the lower driving device. The tire blank can thus be displaced in simple manner into the lower half of the mould, whilst maintaining the gap between the rim rings, by means of the inherently present drive for the upper rim seat ring.

BRIEF DESCRIPTION OF THE DRAWINGS

An embodiment of the invention will now be described with reference to the accompanying drawings, in which:

FIG. 4 shows yet another similar section illustrating the condition prevailing when the press is almost closed, and FIG. 5 shows a further vertical section illustrating the condition with the press fully closed.

DESCRIPTION OF THE PREFERRED EMBODIMENT

Figure 1:
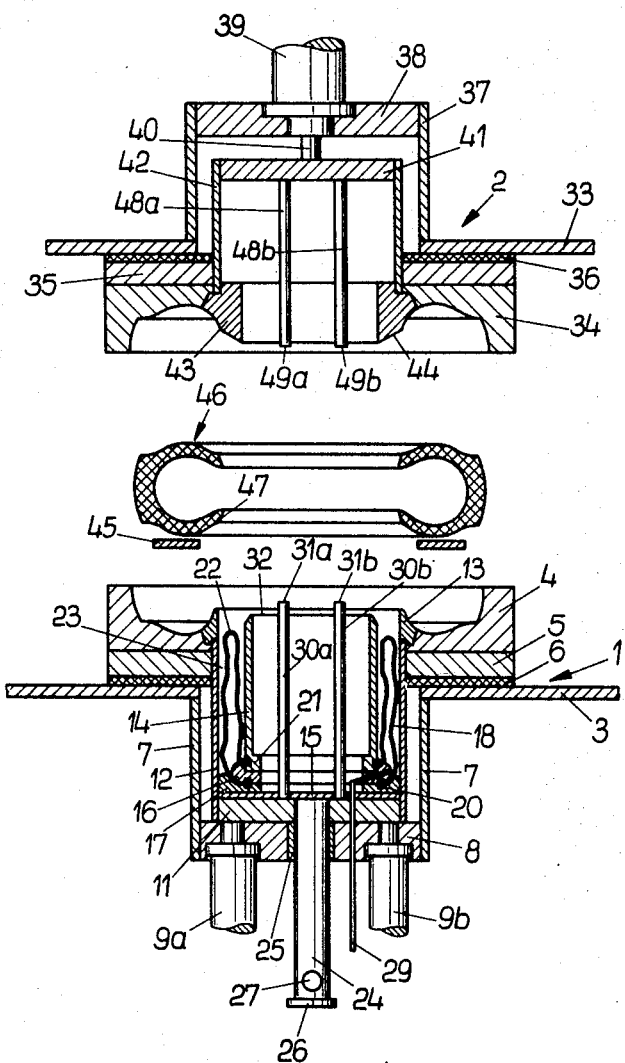
FIG. 1 shows a vertical section through an opened tire vulcanising press, a tire intended for remoulding and for vulcanising being inserted between the halves of the mould.

Referring to the drawings, there are shown in a simplified manner a lower part 1 and an upper part 2 of a press, together with the devices situated thereon.

The lower part of the press includes a table 3 on which the lower half 4 of a mould has been placed with its heating plate 5 over an insulating intermediate layer 6. On the table 3 there are arranged downwardly extending walls 7 which carry a base 8 at the bottom. Pressure fluid cylinders 9a and 9b for the lifting and lowering of the system to be described, are situated on the base 8.

Figure 2:
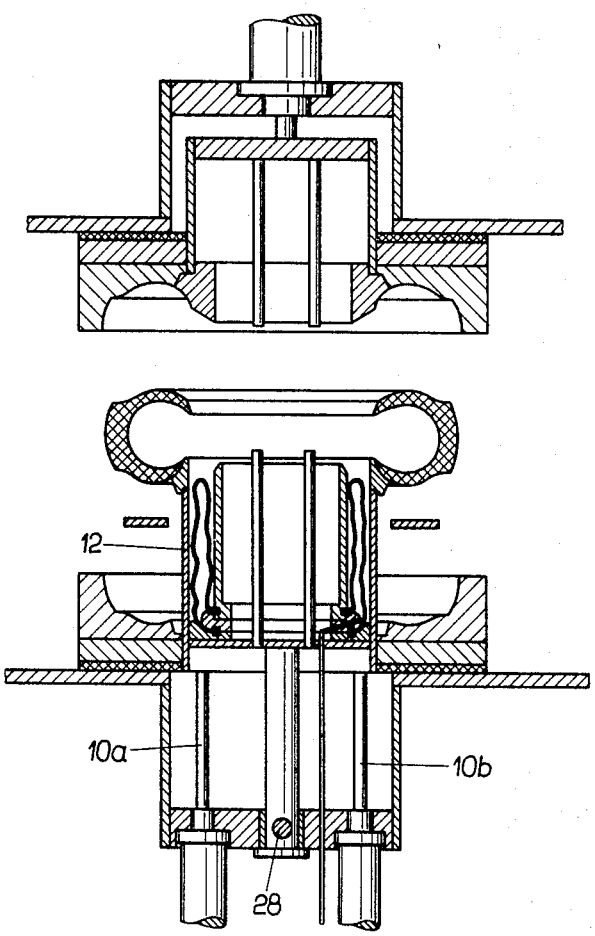
FIG. 2 shows a section similar to that of FIG. 1 in which a tire is lifted off the support of a loading device.

The base 11 of an ejector cylinder 12 is firmly connected to piston rods 10a and 10b coordinated with the cylinders 9a and 9b (see FIG. 2). The ejector cylinder 12 has a lower tire rim seat ring 13 on its upper edge. A bag guiding cylinder 14 is displaceable relative to the ejector cylinder 12. The bag guiding cylinder rests indirectly, through bag clamping rings 16, 17 on a plate 15.

A heating bag 18 has marginal reinforcements 19 and 20 forming a rims or edges. The marginal rim 19 is clamped between a lower edge 21 of the bag guiding cylinder 14 and the bag clamping ring 16, whereas the marginal rim 20 is clamped between the bag clamping ring 16 and the lower bag clamping ring 17. The edge 21 of the bag guiding cylinder, the middle clamping ring 16, the lower clamping ring 17 and the plate 15 are firmly pressed against each other by means of screws which are not illustrated. The bag 18 is folded double about a folding line 22 and is situated in an annular space 23 between the inner surface of the ejector cylinder 12 and the outer surface of the bag guiding cylinder 14. This annular space 23 is so arranged with respect to the dimensions of the bag that the bag can be forced into this annular space, in such a way that it is pressed very firmly against the outer surface of the bag guiding cylinder 14 as well as against the inner surface of the ejector cylinder 12.

A downwardly extending rod 24 is fastened to the centre of the plate 15 of the bag guiding cylinder. This rod passes through a guiding sleeve 25 in the base 8. The rod 24 has a flange 26 or collar at the bottom, and a little above this flange, a transverse bore or hole 27. A locking bolt 28, illustrated in cross-section only (in FIGS. 2 to 5), fits into the transverse hole 27 of the rod 24, which is arranged in the base 8.

A pipe 29 which opens into the inside of the heating bag though the middle bag clamping ring 16, supplies heating fluid.

Two thrust or abutment rods 30a and 30b having upper end faces 31a and 31b which act as abutments in a manner yet to be described, are arranged on the base 11 of the ejector cylinder 12. In the fully retracted position of the bag illustrated in FIG. 1, the upper edge 32 of the bag guiding cylinder 14 is positioned a little lower than the upper edge of the lower tire rim seat ring 13.

The upper part 2 of the press has a fastening plate 33 which may be lifted and lowered for the purpose of opening and closing the press, by a mechanism not illustrated in the drawings. The upper half 34 of the mould, with a heating plate 35, is fastened onto the underside of the plate 33, over a thermally insulating intermediate layer 36. An upwardly extending cylindrical extension 37 is fitted on the plate 33. This extension 37 is closed off by a base 38.

The base 38 has fastened to it a pressure fluid cylinder 39 having an effective cross-section greater than the sum of the effective cross-sections of the lower pressure fluid cylinders 9a and 9b. The cylinder 42 has a base 41 which is firmly connected to a piston rod 40 of the pressure fluid cylinder 39. A cylinder 42 carries an upper tire rim seat ring 43 on its lower edge. This upper tire rim seat ring has a conical surface 44 which acts as a guiding surface for the insertion of the bag 18 into the cavity of the tire, in manner yet to be described.

Secured to the base 41 of the cylinder 42 there are two downwardly projecting rods 48a and 48b which are coaxially situated with respect to the rods 30a and 30b and which have lower end faces 49a and 49b acting as abutment faces.

A support 45 forming a part of a loading device for a tire 46 is also illustrated in FIG. 1. The mechanism for the displacement of the support 45 is not shown and may be any known mechanism.

The operation of the press will now be described with reference to all of the figures, each figure showing a different stage in the operation of the device.

FIG. 1 shows the condition of the fully opened press, in which the upper part 2 of the press has been raised as far as possible. The upper tire rim seat ring 43 has been raised upwards until it is against the upper half 34 of the mould. The lower tire rim seat ring 13 has analogously been pulled downwards until it is against the lower part 4 of the mould. The tire 46 which is to be vulcanized for remoulding, has been inserted between the two halves of the mould by means of the loading device 45. The bag 18 has disappeared completely into the annular space 23. The bag guiding cylinder 14 has been withdrawn as far as possible into the ejector cylinder 12.

Starting from this position, the cylinders 9a, 9b are pressurised as shown in FIG. 2, thereby raising the ejector cylinder 12, until the tire rim seat ring 13 grasps the lower rim 47 of the tire and raises the tire a short distance above the support 45 of the loading device. The loading device, which is open at one side and has an opening slightly greater than the outer diameter of the lower rim seat ring 13, is then retracted.

During the upward movement of the ejector cylinder 12, the bag guiding cylinder 14 and the bag 18 were drawn upwards, due to the friction between the bag 18, the ejector cylinder 12 and the bag guiding cylinder 14. Finally and at the same time, the rod 24, firmly connected to the plate 15, is drawn upwards sufficiently for the flange 26 to come into contact with the underside of the base 8. At this instant, the locking bolt 28 (see FIG. 2) is inserted automatically into the transverse bore or hole 27.

In the course of the closing action, during which the upper part 2 of the press is lowered, the upper tire rim seat ring 43 is also moved downwards, relative to the upper part of the press, at the same time and as a result of pressurisation by the pressure fluid cylinder 39. The upper part 2 of the press is so arranged that it is downwardly displaceable initially until the end faces 31a, 31b, 49a, 49b of the rods 30a, 30b and 48a, 48b come into contact with each other. The tire rim seat rings 43 and 13 are then situated at a distance from each other which is a little smaller than the final gap assumed during vulcanising. In this way the upper rim 50 of a tire is still grasped when it comes closer to the lower rim 47 than is planned.

Figure 3:
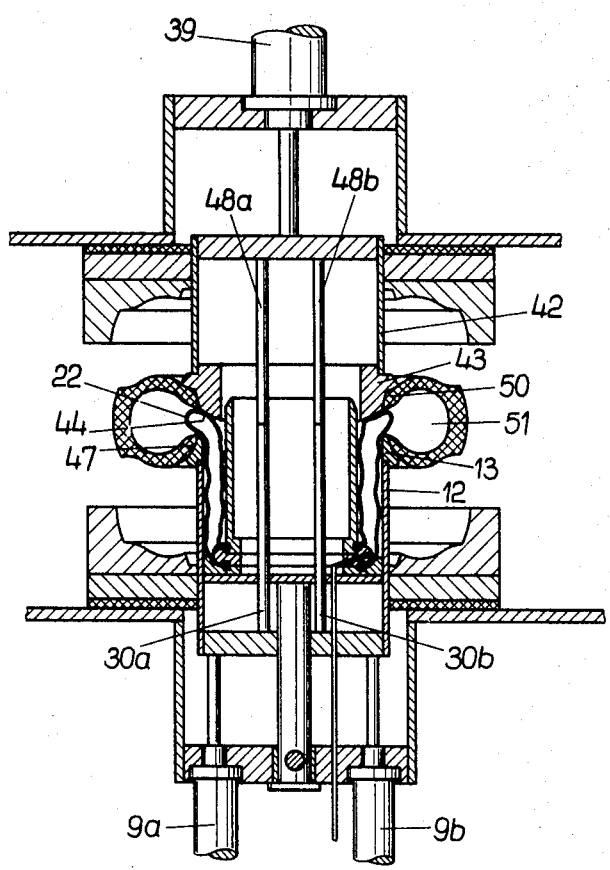
FIG. 3 shows a section similar to that of FIG. 1 in which the upper part of a press has been displaced downwards.

In continuing the closure movement of the press, as shown in FIG. 3, the lower tire rim seat ring 13 and the upper tire rim seat ring 43 are moved downwards while maintaining the gap between them, the ejector cylinder 12 on which the lower rim seat ring 13 is fastened being displaced relative to the lower half 4 of the mould, until the lower tire rim seat ring 13 and the tire 46 have been brought into contact with the lower half 4 of the mould. During this closing motion, the bag guiding cylinder 14 together with the bag clamping rings 16, 17 firmly joined to it, remain stationary relative to the frame of the press, so that the bag finally impinges with its folding line 22 onto the conical surface 44 and is guided into the tire cavity 51. When the heating bag 18 has been largely inserted into the tire cavity 51 (FIG. 4), fluid under pressure is fed into the bag through the pressure fluid feed pipe 29, so that the bag is brought against the inner surface 52 of the tire.

The completely closed position of the press is shown in FIG. 5. FIG. 5 shows an opening 53 of the pressure fluid pipe 29 for the ingress of fluid to the bag situated at a low point of the bag, due to the fact that the bag is in the lower part of the press. It may be seen from FIG. 5 that, when the press is closed completely, a small gap 54 is formed between the abutment faces of the rods 48a, 48b and 30a, 30b. This means that the rim seat rings have been moved apart slightly again, assuming their final position.

After the heating period has elapsed, the press is opened by raising the upper part of the press, thereby separating the upper part of the mould together with the upper tire rim seat ring from the upper side of the tire. The bag 18 remains initially within the tire. The ejector cylinder 12 is then raised by the actuation of the cylinders 9a, 9b, the tire 46 being moved at the same time out of the lower half 4 of the mould. It is plain from an examination of FIG. 5, that the bag is withdrawn from the tire cavity during this raising of the tire, since the bag clamping rings 16, 17 are still stationary. At the same time, the bag is drawn into the annular space between the ejector cylinder and the bag guiding cylinder.

The ejector cylinder 12 is raised until the bag guiding cylinder and the bag have disappeared completely within the ejector cylinder 12, so that their relative positions correspond to those shown in FIG. 1. In this position, the tire is raised to a height at which the loading device 45 may be inserted under it. After the loading device has been inserted under the tire, the bolt 28 is pulled out automatically from the hole 27 in the rod 24 and the cylinders 9a, 9b move the ejector cylinder downwards together with the bag guiding cylinder 14 drawn by the friction with the bag 18, until the ejector cylinder finally occupies the position illustrated in FIG. 1, after which the press may be loaded again as hereinbefore described.

I claim:

1. A tire vulcanising press for vulcanising preformed tire blanks including an upper part and a lower part, a mould having an upper half on the upper part of the press and a lower half on the lower part of the press, and an assembly on the lower part of the press having an outer cylinder, a lower seat ring for a tire rim on the outer cylinder, a driving system for the outer cylinder, the outer cylinder being movable axially by the driving system to eject a tire from the lower half of the mould, an inner cylinder within the outer cylinder movable into an upper position, a heating bag which may be arranged, when folded double, in the annular space between the inner and outer cylinders and which may be guided by the inner cylinder, clamping rings connected to the inner cylinder between which the edges of the bag may be clamped, and a locking device for retaining the inner cylinder in the upper position, the inner cylinder being drawn into the upper position during an upward axial movement of the outer cylinder by the frictional forces between the bag, the inner cylinder and the outer cylinder.

2. A tire vulcanising press as claimed in claim 1, including a downwardly projecting rod extending from the inner cylinder and a locking bolt arranged to engage the rod in the lower part of the press to provide the locking device.

3. A tire vulcanising press as claimed in claim 2, wherein the clamping rings form an assembly firmly joined to the lower extremity of the inner cylinder, the individual rings pressing towards one another.

4. A tire vulcanising press as claimed in claim 1, including a loading device having a support for a tire, support being so arranged that when the outer cylinder is in its fully raised position it lifts a tire off the support.

5. A tire vulcanising press as claimed in claim 1, wherein the lower rim seat ring is at the upper edge of the outer cylinder, the arrangement being such that when the inner cylinder and the heating bag have been withdrawn into the outer cylinder to the maximum extent, the upper edge of the inner cylinder and the fold line of the bag are either at the same height or lower than that of the lower rim seat ring.

6. A tire vulcanising press as claimed in claim 1, including a first abutment rod projecting upwards from the base of the outer cylinder, a further axially displaceable cylinder on the upper part of the press, an upper seat ring for a tire rim on the further cylinder, a second abutment rod projecting downwards from the top of the further cylinder, the first and second abutment rods being arranged to abut during the closing of the press, the lengths of the two abutment rods being such that the final distance between the upper and lower rim seat rings when the press is closed is greater than a distance between them during the closing of the press.

7. A tire vulcanising press as claimed in claim 6, including a driving device for axially displacing the further cylinder carrying the upper rim seat ring, the driving device for the further cylinder being more powerful than the driving system for the outer cylinder, whereby the outer cylinder may be displaced as a result of forces acting through the abutment rods against the action of the driving system.

References Cited

UNITED STATES PATENTS

| | | | |
|---|---|---|---|
| 2,730,763 | 1/1956 | Brundage | 18—17 |
| 2,736,059 | 2/1956 | Frank | 18—17 |
| 2,858,566 | 11/1958 | Brundage | 18—17 |
| 3,396,221 | 8/1968 | Balle et al. | 18—17 |

J. HOWARD FLINT, Jr., Primary Examiner

U.S. Cl. X.R.

18—2